United States Patent [19]
Munter

[11] Patent Number: 5,475,679
[45] Date of Patent: Dec. 12, 1995

[54] LARGE CAPACITY ATM SWITCH

[75] Inventor: Ernst A. Munter, Kanata, Canada

[73] Assignee: Northern Telecom Limited, Montreal, Canada

[21] Appl. No.: 352,405

[22] Filed: Dec. 8, 1994

[51] Int. Cl.⁶ .................................................. H04L 12/54
[52] U.S. Cl. .................. 370/58.2; 370/60.1; 370/61; 370/65.5; 370/94.2; 359/117; 359/123; 359/139
[58] Field of Search .................... 370/58.1, 58.2, 370/60, 60.1, 61, 65.5, 85.2, 85.6, 85.9, 94.1, 94.2; 359/117, 123, 124, 235, 139; 340/825.5, 825.51

[56] References Cited

U.S. PATENT DOCUMENTS

| | | | |
|---|---|---|---|
| 4,123,624 | 10/1978 | Gagnier et al. | 370/65.5 |
| 4,701,907 | 10/1982 | collins | 359/117 X |
| 5,091,905 | 2/1992 | Amada | 370/60 |
| 5,159,591 | 10/1992 | Gohara et al. | 370/60 |

*Primary Examiner*—Douglas W. Olms
*Assistant Examiner*—Russell Blum
*Attorney, Agent, or Firm*—Yoshiharu Toyooka

[57] ABSTRACT

A large capacity ATM switch includes a space switch core connecting input buffer modules and output buffer modules by way of high speed links. Upon request from an input buffer module, the space switch core sets up a connection to a desired output module. Data are sent in a burst consisting of a train of ATM cells of any arbitrary number. As the data are sent in trains of more than one ATM cell, the connection control of the core can be made to operate at a much slower speed. Electro-optical arrangements of the space switch core are described as embodiments.

15 Claims, 13 Drawing Sheets

Fig 4 (Port A)

Fig 6 (Port A)

LARGE CAPACITY ATM SWITCH

FIELD OF THE INVENTION

The present invention relates generally to large capacity ATM switches. In particular, it is directed to ATM switches in which high speed links connect input/output buffers and a space switch core, and connections are set up through the space switch core whenever trains of cells are to be transmitted between the input and output buffers.

BACKGROUND OF THE INVENTION

High capacity fiber transmission already provides the technical means to move very large amounts of data from node to node at reasonable cost. Broadband access systems are based on systems such as fiber to the home, fiber to the curb, coaxial cable, or wireless, and will serve to connect subscribers to local access nodes. As the number of asynchronous transfer mode (ATM) broadband subscribers grows, and total network traffic volume increases, the construction of an efficient access and tandem network will require very large ATM switches with aggregate capacities in the 100's to 1000's of gigabits per second (Gbit/s).

Innovations in network architecture may lead to a more distributed network of a larger number of smaller nodes, but the geographic clustering of traffic in cities and communities, the shrinking cost of collecting a large bandwidth over ring, tree, or star access networks, and the operational economics of fewer, larger sites is likely to continue to favor the concentration of traffic into exchanges serving 10,000 to 100,000 subscribers. Similarly, fewer but larger tandem switches will be more economical. Local and tandem exchanges capable of switching 5,000 to 80,000 Erlang of voice traffic are already common today. Extending from this existing telephone network capacity and assuming that traffic patterns and communities of interest do not change substantially, a simple estimate of switch sizes would be 0.4 to 5 Gbit/s at 64 kbit/s.

Traffic demand and average bit rates of terminals in the broadband network are less predictable. Average peak hour demand may range from a few 100 kbit/s to 10 Mbit/s or more per subscriber, depending upon the offered service. For example, digital video-on-demand, using MPEG2, could easily generate a network demand of 5 or 10 Mbit/s per household (the bottleneck in this scenario appears to be the video server capacity).

It would require a gross switching capacity of one Terabit/s to handle the aggregate demand of a 100,000 subscriber head end switch. Similarly, millions of already existing home computers could transfer data over a broadband network at peak rates well in excess of 10 Mbit/s, if such a network were offered economically.

Today, ATM switches which address both the data and the evolving multi-media market are being offered. These switches have capacities ranging from less than 600 Mbit/s to a few 10's of Gbit/s. The task of switching much larger amounts of point to multi-point or point-to-point traffic efficiently will have to be solved in future.

In U.S. Pat. No. 5,126,999, issued Jun. 30, 1992 (Munter et al), an ATM switch is described in which output segregated input buffers are operated on real-time by crosspoint selection circuits implementing a combined buffer fill/age algorithm.

In U.S. Pat. No. 5,241,536, issued Aug. 31, 1993 (Grimble et al), a timeslot utilization means is provided in an ATM switch for scheduling the earliest possible connection between an input port and output ports.

In U.S. Pat. No. 5,130,975, issued Jul. 14, 1992 (Akata), a timeslot scheduling unit in an ATM switch prevents the packets from collision in a space division switching unit. Each packet buffer unit at each port writes packets sequentially but reads out randomly in the timeslots assigned by the timeslot scheduling unit so that the throughput of the space division switching unit is improved.

In U.S. Pat. No. 5,157,654, issued Oct. 20, 1992 (Cisneros), a contention resolution technique for a large ATM switch is described. It utilizes cell address look-ahead in conjunction with parallel planes of self-routing cross-points, staggered time phased contention resolution and shared memory based input and output modules.

In U.S. Pat. No. 4,956,839, issued Sep. 11, 1990 (Torii et al), an ATM switch includes ATM line terminating units and a self-routing space switch.

The overall architecture of the switches of the present invention is based loosely on a space switch crosspoint, input and output buffers and substantially high speed links connecting them. None of the above patents is concerned with packet switches in which a train of one or more ATM cells are transmitted by way of high speed links through a space crosspoint in one burst.

OBJECTS OF THE INVENTION

It is therefore an object of the invention to provide a large capacity ATM switch.

It is another object of the invention to provide a large capacity ATM switch which includes input and output buffer modules and a space switch core.

It is yet a further object of the invention to provide a large capacity ATM switch which uses a burst mode of switching.

SUMMARY OF THE INVENTION

Briefly stated, the invention is directed to a high capacity ATM switch for switching data between input ports and output ports in a variable length train of digital cells, each input and output port handling one or more channels and each cell comprising a fixed number of bytes and including a channel indication therein. The switch includes an input buffer at each input port for separately storing trains of digital cells destined for output ports and for sending a connection request through a control link to switch core means. In response to the connection request from one or more input buffers, the switch core means makes and breaks high speed data link connections between the input ports and the output ports at desired times and indicates by way of the control link to each input buffer when to send the train of digital cells stored therein. The switch also includes an output buffer at each output port which separately stores cells of bytes received from the switch core means and destined to the channel in response to the channel indication of each cell.

According to another aspect, the invention is directed to a method of switching data in ATM mode between input ports and output ports in a variable length train of digital cells, each input and output port handling one or more channels and each cell comprising a fixed number of bytes and including a channel indication therein. The method comprises steps of separately storing, at an input buffer of each input port, trains of digital cells destined for output ports and sending a connection request through a control link to a switch core. The method further includes steps of the switch core means, in response to the connection request from one or more input buffers, making and breaking high speed data link connections between the input ports and the output ports at desired times and indicating by way of the control link to each input buffer when to send the train of digital cells stored therein. The method also includes a step of separately storing, at an output buffer of each output port, cells of bytes received from the switch core means and destined to the channel in response to the channel indication of each cell.

BRIEF DESCRIPTION OF THE DRAWINGS

The invention will be further understood from the following description with reference to the accompanying drawings, in which.

DETAILED DESCRIPTION OF THE PREFERRED EMBODIMENTS OF THE INVENTION

Figure 1:
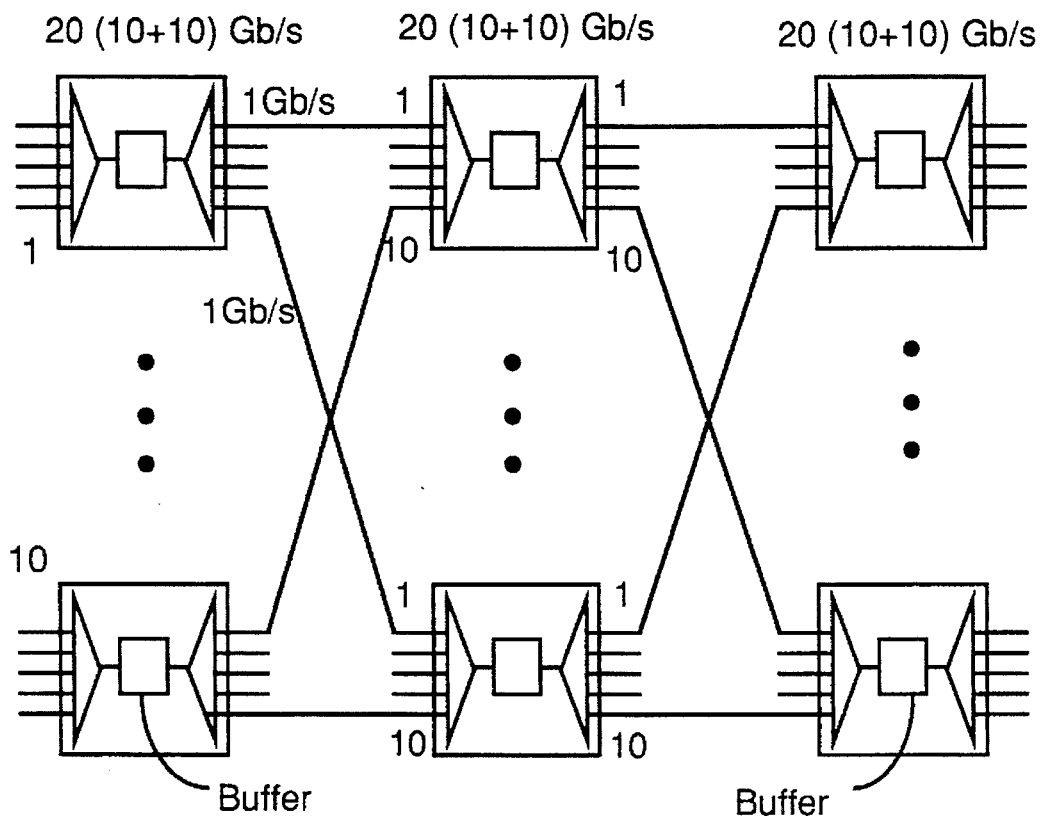
FIG. 1 is a schematic illustration of a known expansion scheme.
Figure 2:
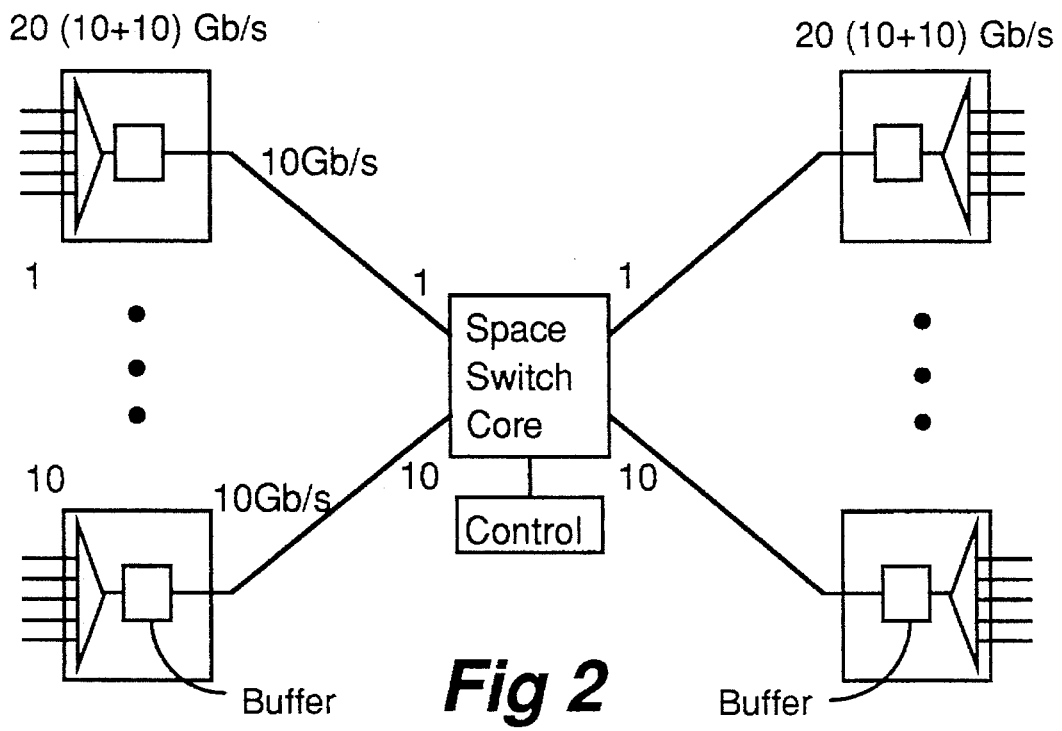
FIG. 2 is a schematic illustration of an ATM switch using a novel expansion scheme according to the invention.

In the simplest form, an ATM switch comprises a switch core, peripheral units with transmission interfaces, and a software control structure running on embedded and/or external CPUs. According to the invention, a large capacity ATM switch is created by expanding this architecture by inserting independent buffered satellite switches between groups of lower speed access peripherals and the switch core. FIG. 1 illustrates a widely utilized three stage expansion scheme for a large capacity switch. For example, a 100 Gbit/s capacity switch can be constructed by using thirty 10 Gbit/s switches in three stages, with 1 Gbit/s links connecting them together. A total of 200 links are required. FIG. 2 is a schematic illustration of a novel expansion scheme which is used to construct the large capacity ATM switch of the invention. Each buffered switch can be considered as a stand-alone switch and a large switch is created by tying together a cluster of smaller switches using very high speed (e.g. 10 Gbit/s) trunks. In this scheme, the middle stage of the three stage expansion scheme is replaced by a space switch core with no buffering. The space switch core sets up connections but, instead of processing one ATM cell at a time as in the scheme of FIG. 1, each outer stage switch transmits a train of more than one ATM cell at a time through the space switch core. The space switch core control can be operated at a slower speed. Twenty smaller switches and 20 links are required to construct a switch of the same capacity as the one shown in FIG. 1. This expanded architecture is analogous to the known scheme of building a large network by trunking many smaller switches to a higher speed switch with one major difference, which is that in the switch architecture the satellite switches share the control of the switch core. This novel switch architecture lends itself well to the use of high speed electro-optical technology to drastically reduce switch complexity compared to electronic-only solutions. It avoids the need for electronics operating above 10 Gbit/s with its attendant high power consumption. It makes use of peripheral buffers that are based on smaller capacity ATM switches that are developed for other applications.

Figure 3:
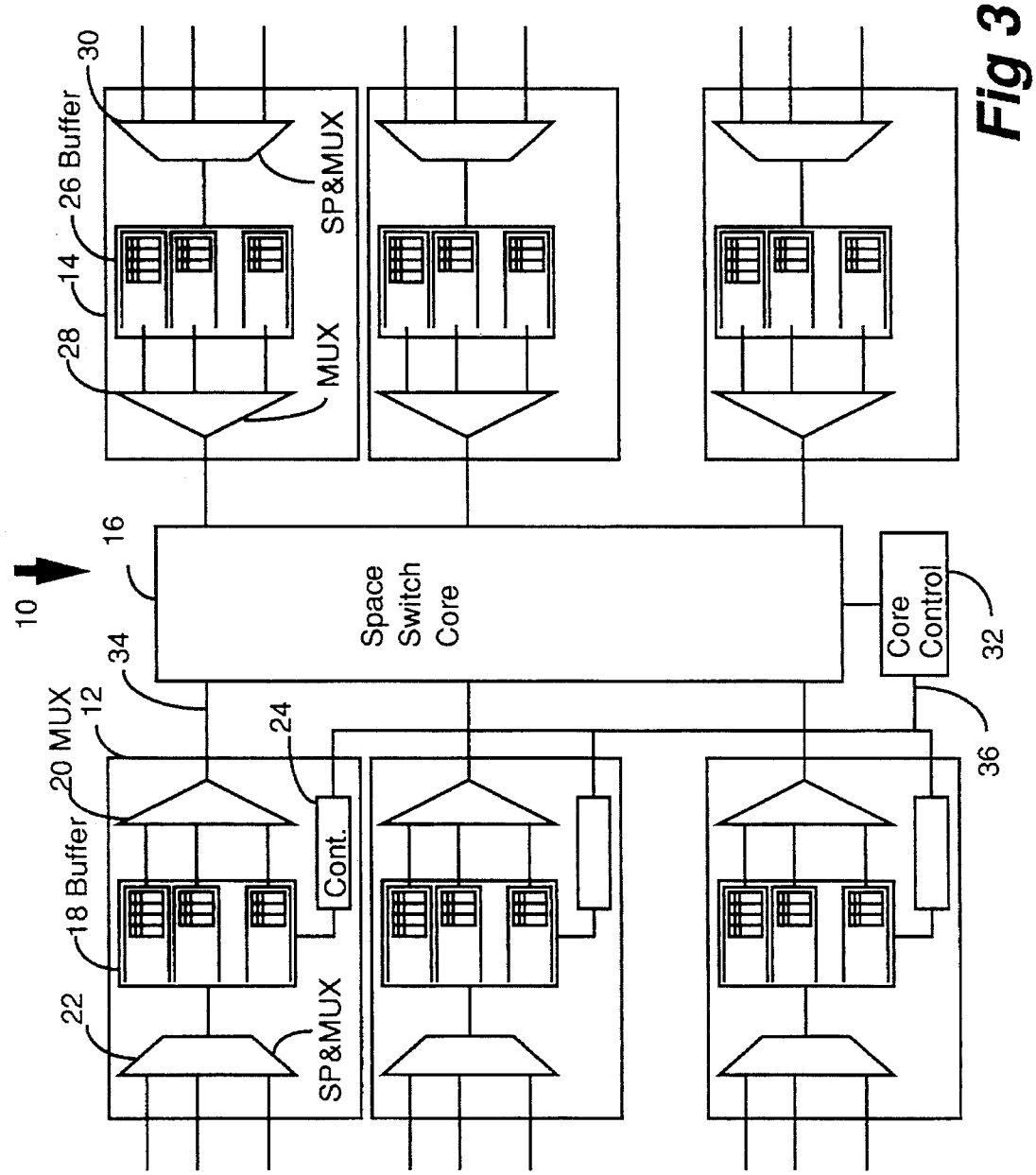
FIG. 3 shows basic components of the ATM switch according to the invention.

FIG. 3 shows schematically the basic components of the N port ATM switch (e.g. N=16) according to the invention. The switch 10 is shown in the unfolded configuration and includes N input buffer modules 12, N output buffer modules 14, and an N port space switch core 16. Each input buffer module consists of a cell RAM 18, a multiplexer 20 and a S/P (serial-to-parallel) converter and multiplexer 22. A buffer control 24 is also shown. Likewise, in each output buffer module, there are a cell RAM 26, a multiplexer 28 and P/S (parallel-to-serial) converter and multiplexer 30. A space switch core 16 connects the input and output modules under the control of a core controller 32. It should of course be noted that ordinarily an input buffer module and an output buffer module are located at a port and therefore the cell RAM at each buffer module can be made of a single memory with a time divided buffer control circuit serving both functions.

The switch carries ATM cells transparently from the input buffer modules to the appropriate output buffer modules through the space switch core via the data link 34. The input buffer module receives incoming traffic in ATM cells and logically segregates them into FIFOs (pages) according to port destination, and then delivers a train of cells from the selected FIFO (page) to the space switch through the data link. Cells can also be prioritized also for different services if needed. Cell routing information which is inherent in ATM header VCI/VPI fields is translated into switch specific port address information in the input buffer modules and prepended to the standard 53-byte cells. Since there are no cell buffers in the space switch core, transmission into the space switch core from the individual buffer modules is coordinated in such a way that cells do not collide at the space switch core outputs. This is achieved by using a common hardware controller circuit (core controller) 32 which receives status information (e.g. a connection request) from the input buffer modules. The status information (e.g. a connection request) indicates that a connection is requested to the output port and the input buffer contains an indicated number of cells destined for that output port. When requested by input buffer modules, the core controller sets up crosspoint connections in the space switch core and sends control information (e.g. a connection grant) back to the input buffer modules to schedule the transmission of cells therefrom. This control information is passed through the control links 36 which are both functionally and physically separate from the data links. Synchronization between control and data links ensures the establishment and holding of connections in the space switch core in time with the passage of the indicated number of a train of cells.

Shown in the following figures is one preferred embodiment of the invention which uses links of 10 Gbit/s speed and a non-blocking space switch crosspoint, using electrooptical components. This inventive concept can of course be applied to an all optical crosspoint switch.

Figure 4:
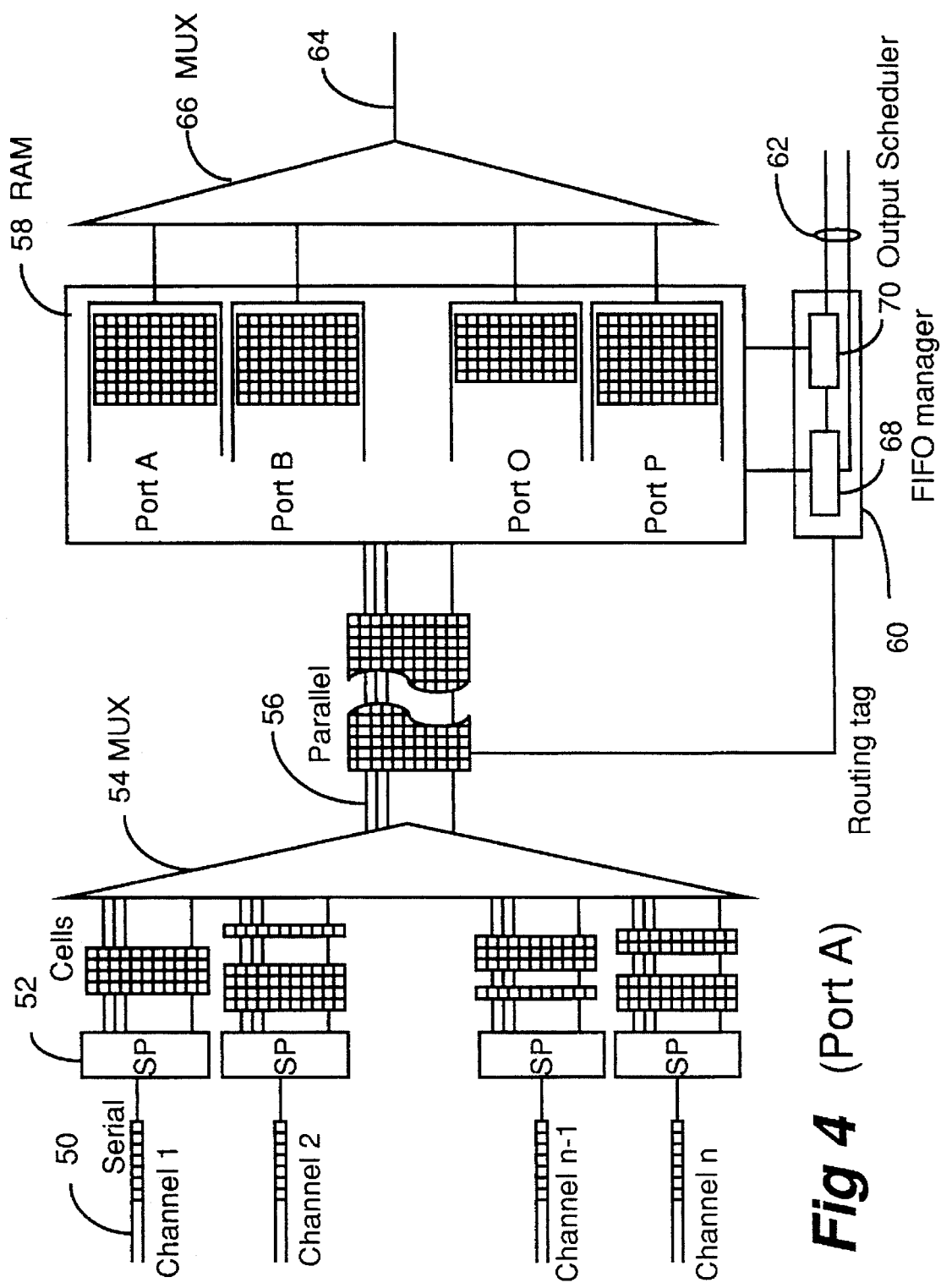
FIGS. 4–7 show various parts of the ATM switch of one embodiment of the invention in more detail.

FIG. 4 illustrates the input buffer module at input port A. Ports are bidirectional and hereinafter are labeled port A to port P. Referring to the figure, data at lower speed links from the access peripherals (channels 1-n) 50 are converted from serial to parallel ATM cells at a converter 52 and then multiplexed at a multiplexer 54 into a single parallel cell bus 56. The attached switch routing tags are read and cells are stored in a cell RAM 58 under the control of the buffer control circuit 60 according to the destination port identified by the switch routing tags. The stored ATM cells are transmitted serially through a data link 64 to a switch core (shown in detail in FIG. 5) by a multiplexer 66.

The switch routing tags contain a field which identifies the output buffer module. The buffer control circuit 60 uses this information to place the cell into the section of RAM assigned to the destination and to send a request for connection message to the space switch core over the control link 62.

The input buffer module comprises a single or dual RAM with a cell wide data bus (busses). The buffer control circuit assigns available RAM cell locations to incoming cells, from a list (FIFO) of free locations. For each non-idle cell received and stored in the cell RAM, a FIFO manager 68 of the buffer control circuit 60 determines the intended space-switch port destination from a routing tag generated from the ATM header. With N=16 such possible destinations, the buffer control circuit maintains N lists (FIFOs) of location identifiers, in which the location of arriving cells is stored. This serves to organize the RAM into N logical cell FIFOs, stored in dynamically sized pages of the RAM. Many other configurations of the cell RAM are possible, such as a separate FIFO for each destination port or a common memory for all the ports. It is also preferable in practice that cells can be prioritized. For this purpose, the cell RAM can be configured to store cells according to their priority.

When it is time to retrieve cells to be sent to the space switch core, the location FIFO for the particular destination port provides a sequence of RAM locations from which to send a train of cells. With priority handling capability, cells with high priority may be read before low priority cells. As cells are sent to the space switch core, their previous locations become available again and can be added back into the free list of the FIFO. Unlike the common memory switch in which the output bus is time divided into X lower speed tributary time slots, one timeslot per port, and these time slots are served in strict round robin sequence, one cell per output port, the output scheduler 70 of the buffer control circuit in FIG. 4 selects a train of cells for the same destination port. The input side of the input buffer module may be time divided (commutated) over a number of lower speed tributary links from the transport peripherals, just like a common memory switch.

The FIFO manager 68 is directly responsive to the routing tags of cells (which in turn are derived from ATM cell headers) received in each cell cycle, in a very similar manner as the FIFO manager of a common memory switch. The only difference is that here the division into N pages or FIFOs is according to destination ports, i.e. ports on the space switch output.

Figure 5:
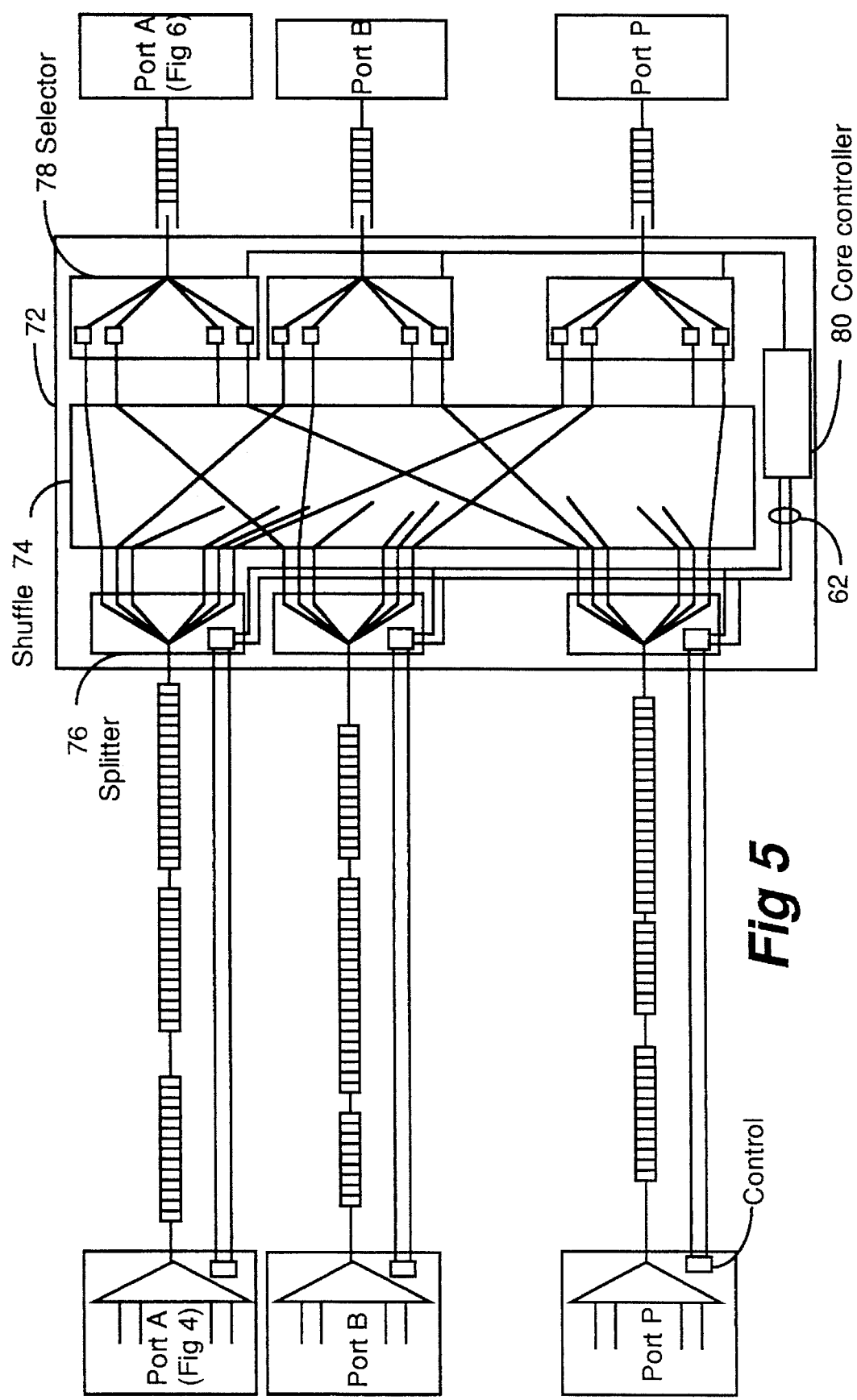

Referring to FIG. 5, according to one embodiment, the space switch core 72 includes an optical shuffle 74, 16 1:16 optical splitters 76, and 16 opto-electrical data selectors 78. The optical shuffle distributes data cells from one input port to all 16 output ports, and the optoelectrical data selector at an output port chooses one desired input under control of the core controller 80. The core controller receives all request messages on control links 62, arbitrates between them, and returns grant messages when the appropriate connection is set up. The switch core of the preferred embodiment will be described in more detail hereinafter.

The input buffer control 60 (FIG. 4) receives a corresponding grant some time after the request was sent. In the meantime, additional ATM cells for the same port destination may have arrived. Thus, when the grant message arrives, several ATM cells can be sent in a single train over the current connection. Therefore, given a large enough cell RAM, the core control can be arbitrarily slow in processing requests and granting connections for the transmission of trains of ATM cells. This simply results in longer bursts and longer waiting times. The algorithm, of course, runs fast enough to avoid exceeding the permissible delay for the switched traffic. Buffer space in the cell RAMs is also dimensioned appropriately to hold the waiting cells without overflowing.

As mentioned above, control and data links are separate and synchronization between them enables the use of the burst mode of switching in that (a) a connection is set up for a duration much longer than one cell period;

(b) a sufficient guard time between cell trains, of the order of one or two cell periods is allowed; and (c) matching of fiber (cable) length, WDM (Wavelength Division Multiplexing), or other suitable means is employed to provide a predictable limit on time skew between each control link and its associated data links.

Figure 6:
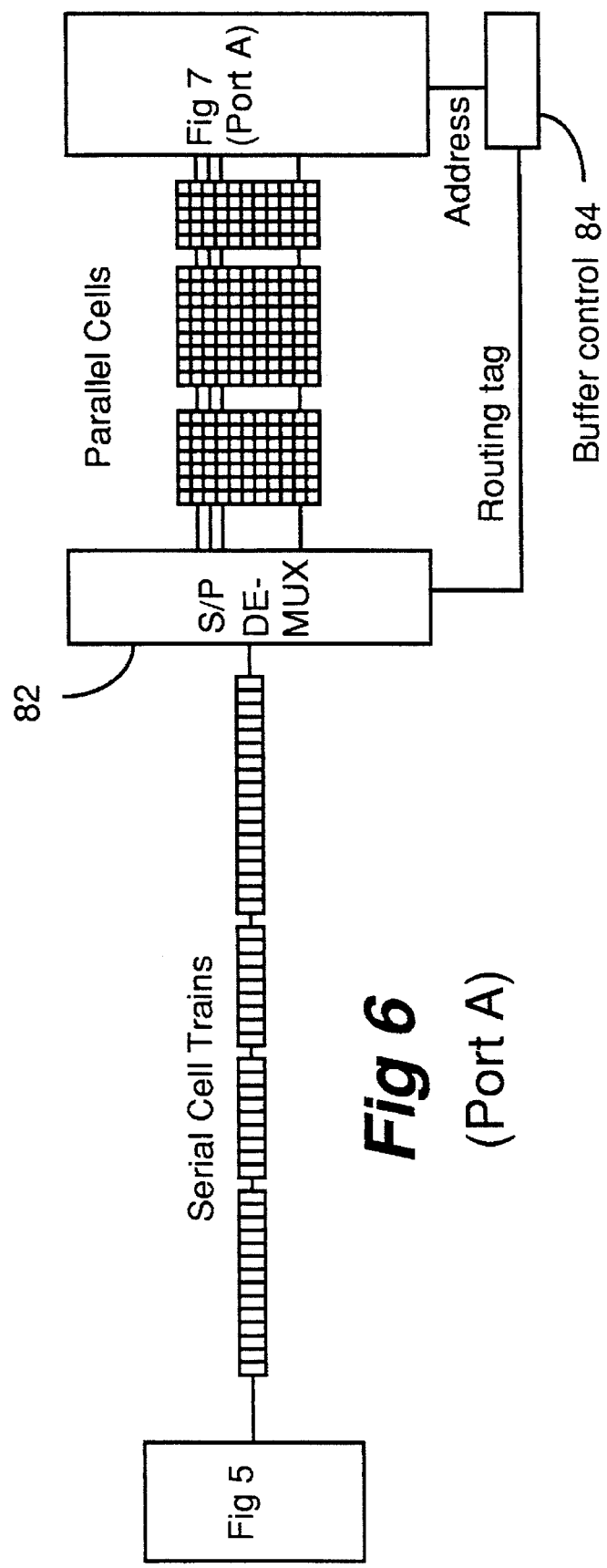
Figure 7:
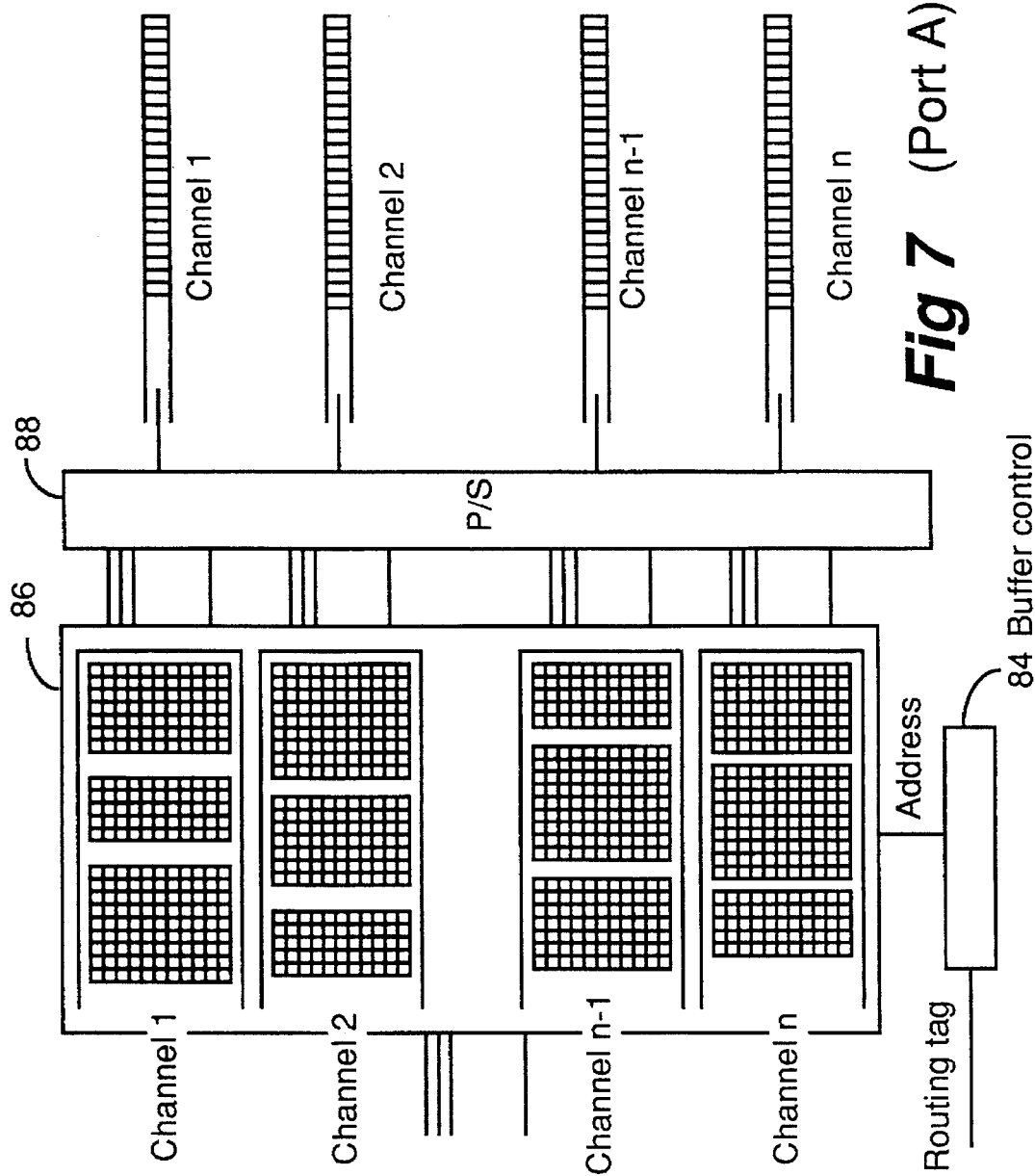

Bursts of ATM cells are then transmitted serially through the space switch core to output buffer modules. FIGS. 6 and 7 depict such a module at output port A. In FIG. 6, serial cell trains destined to port A are received through the data link. They are converted back to parallel ATM cells and demultiplexed at demultiplexer 82 according to the destination channel indicated in the ATM cell header to be stored separately in cell RAM 86 for each destination channel. If necessary, a parallel-to-serial converter 88 converts data and sends the data to a peripheral at an appropriate speed.

One example protocol, as seen by the buffer control logic, is described below.

For each cell that is stored in buffer page [i] of N, the value of [i] is sent to the core controller over the control link. The core controller accumulates that information. As a result, it eventually sets up a space switch connection for [i], and simultaneously sends a command to the buffer to release the corresponding batch of cells. At the time the connection can be established, perhaps M cells for destination [i] may have been reported and accumulated. The cells in the cell RAM can be counted by a simple counter and a simple counter value M can be sent to the core control circuit. When the command "send M cells from buffer [i]" is received by the buffer output scheduler, it will start to transmit cells from [i] on the high speed link to the space switch core until M cells are sent or the FIFO is empty. It will then send idle cells until a new command is received from the space switch core.

Figure 8:
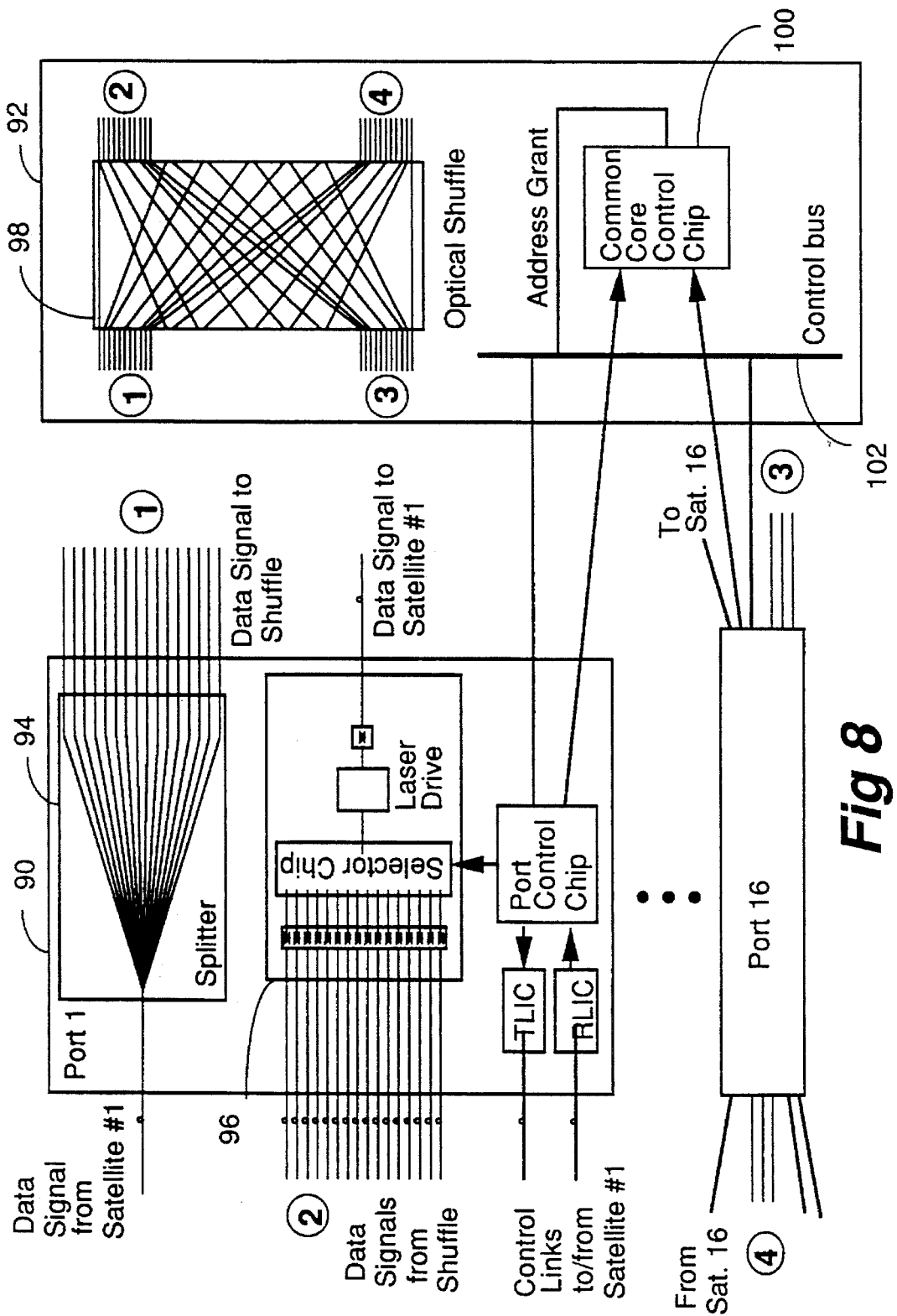
FIG. 8 shows a hardware arrangement of the space switch core of the invention.
Figure 9:
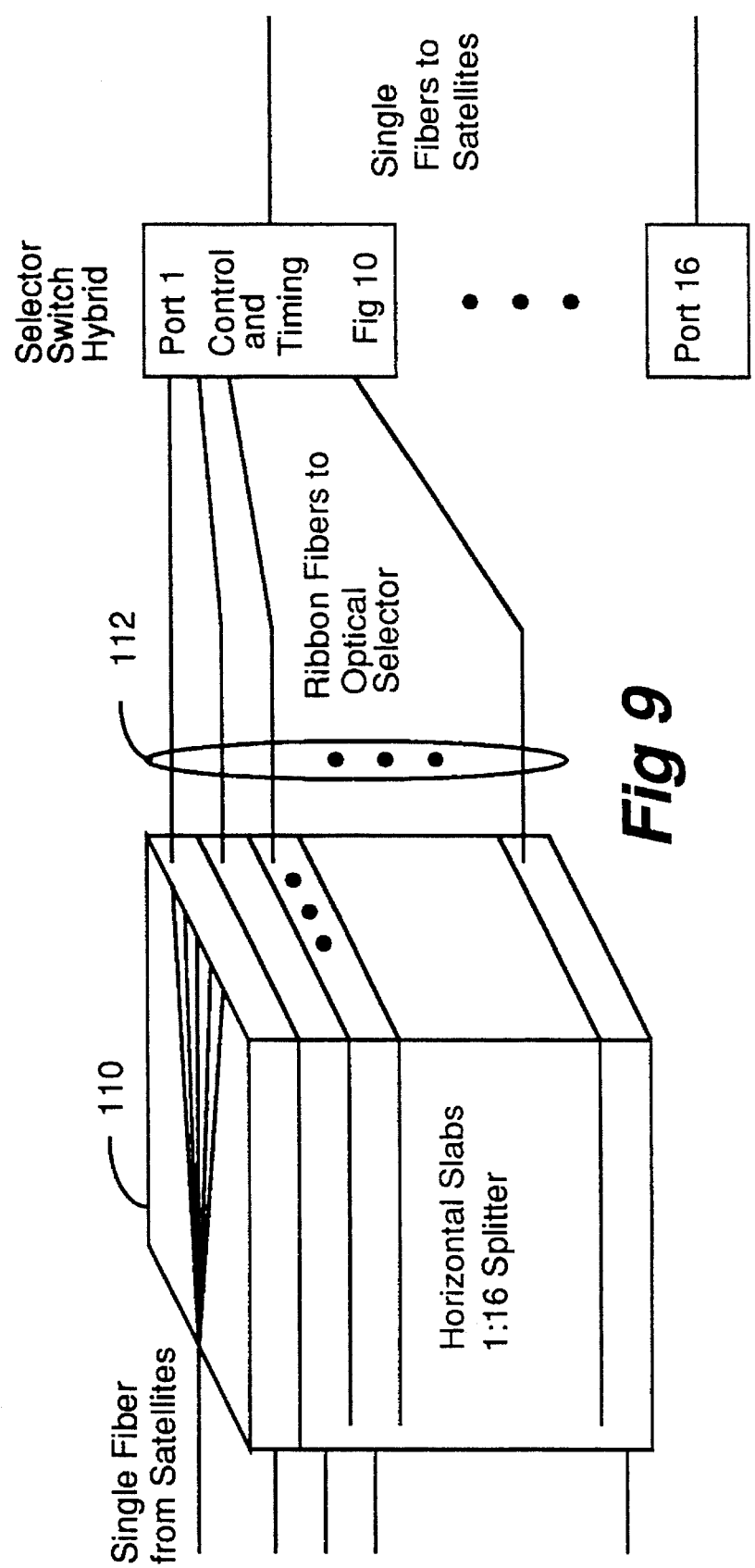
FIG. 9 shows schematically an optical shuffle according to one embodiment of the invention.

FIG. 8 shows in detail the space switch core in a single rack unit and includes 16 port cards 90, and core common equipment 92. Connections are identified by circled numbers. The set of 16 port cards, each with a 1:16 optical splitter 94 and a 16:1 electro-optical selector 96, effectively provides a 16×16 crosspoint. The core common equipment contains the passive 256×256 optical shuffle interconnect 98 and a common controller circuit 100. Many optical arrangements can be used to shuffle a plurality of optical inputs among a plurality of optical outputs, e.g. a fiber optic bundle etc. FIG. 9 illustrates an alternative arrangement of the optical shuffle. The electrical bus between the port cards and the common controller circuit forms the control bus 102.

Referring to FIG. 9, one embodiment of the optical shuffle is shown connected to the optical splitters. Each of the 16 horizontal slabs 110 forms a planar 1:16 splitter which converts the single fiber input of one port into parallel ribbons 112 of 16 fibers each. Each ribbon is connected back to the optical selectors of each port card. In this arrangement, the optical data inputs on a data link are each split (replicated optically) 16 ways and connected to the optical shuffle. Each selector has 16 optical inputs and receives all data inputs from all the port cards.

The inherent optical attenuation of a 1:16 splitter is 12 dB. Excess loss of 2 or more dB will be caused by non-ideal geometries and imperfections in manufacturing. Splitter loss is of concern in the overall optical budget.

This optical arrangement provides the necessary shuffle and crossover of the entire switch bandwidth in an efficient, compact and low cost way and permits both the high speed of the optical signal to keep the number of signal paths low, and the ability to route densely packed optical paths without mutual interference.

Figure 10:
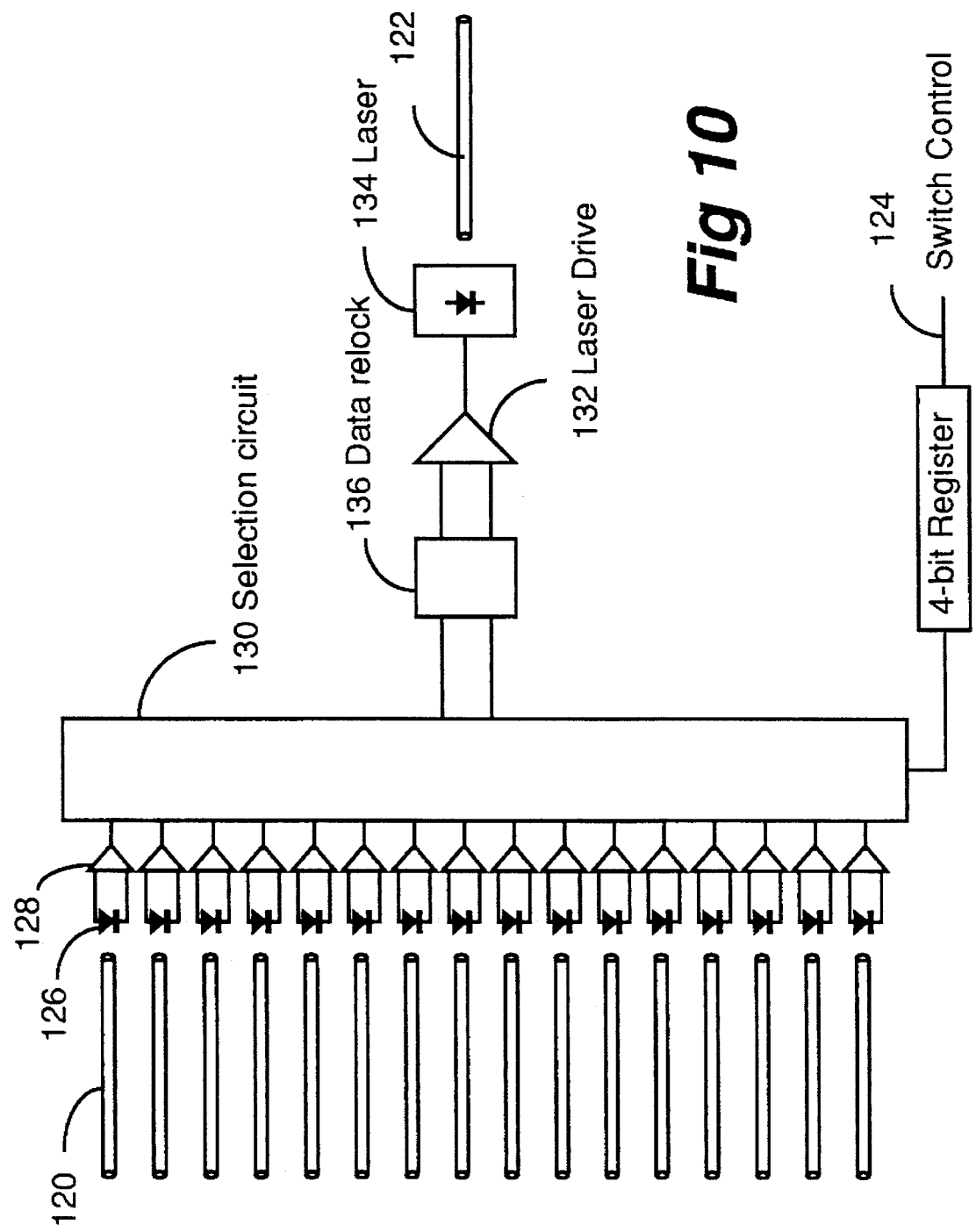
FIG. 10 is a schematic illustration of an optical data selector according to one embodiment.

Referring to FIG. 10, the electro-optical selector is a hybrid assembly on a silicon substrate with 16 optical inputs 120, one optical output 122, and a 4-bit electronic control input 124. The optical fibers are physically attached in grooves etched into the silicon which provide accurate alignment to a PIN diode array 126. The PIN diodes are standard high speed diodes and are fabricated as arrays on 250 µm spacing to match the spacing of the fibers. The diodes are bonded across to the GaAs device which contains amplifiers 128 and selection circuitry 130, driven by a clocked or non-clocked 4-bit control input. The switch control signal chooses one electrical signal, which corresponds to one of 16 optical inputs, to pass to a laser driver circuit 132 which further amplifies and drives the separately packaged laser 134. An output fiber 122 is coupled to the laser 134. If necessary, the selected data signal is reclocked at a data reclock 136 before leaving the GaAs device. Reclocking may be necessary to reduce edge noise, but without it the circuit would handle a wider range of bit rates.

Figure 11:
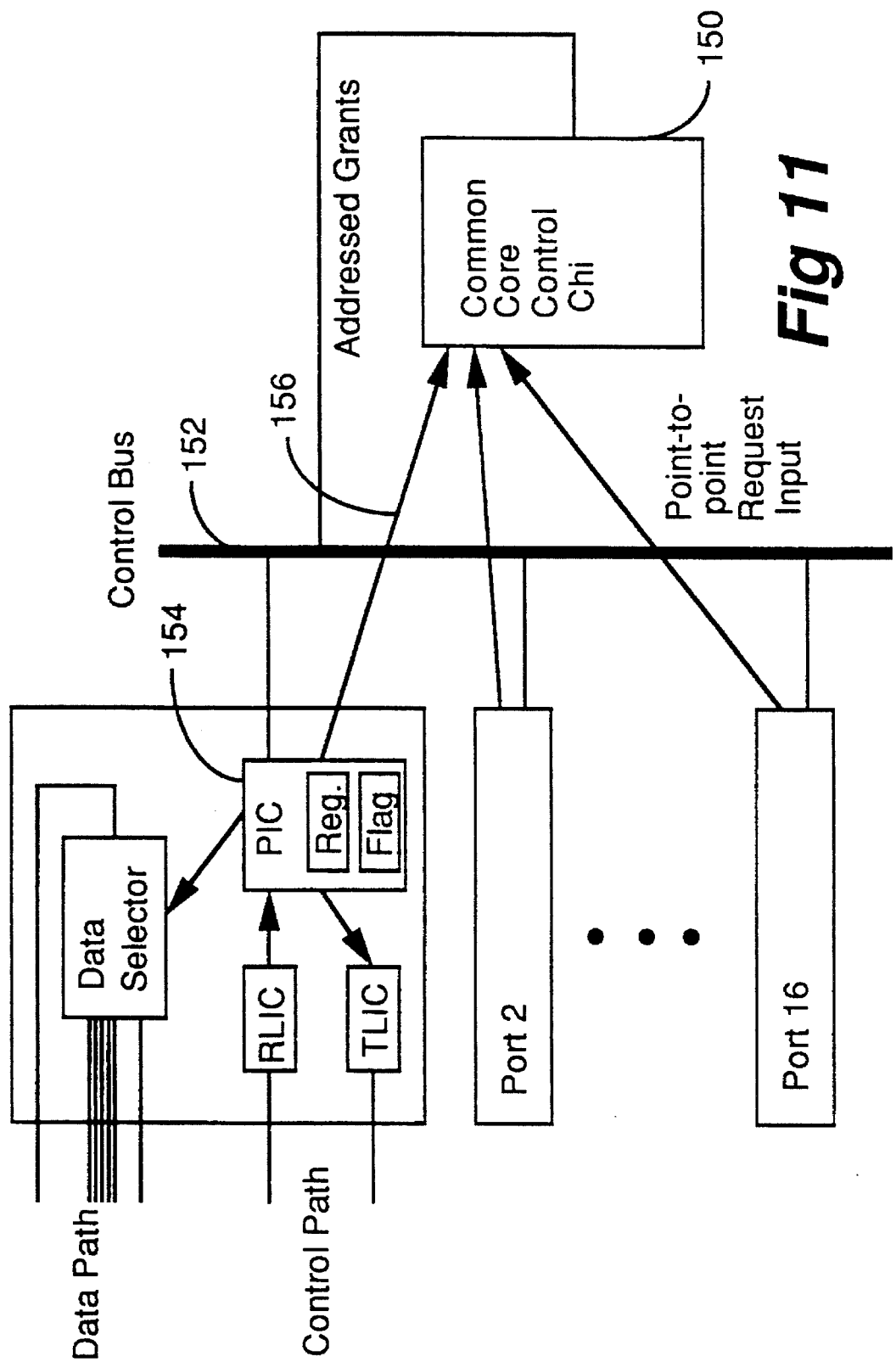
FIG. 11 shows the common core control mechanism in block diagram.

FIG. 11 illustrates schematically the space core control. Briefly summarized, the purpose of the core control is to receive buffer reports from the input buffers and set the space core connection configuration accordingly. The core control also sends this same information back to the input buffers to trigger (grant) the release of the ATM bursts that will match the connection setup. This task is accomplished with a state machine in the common core control chip (CCCC) 150 through the control bus 152 which is able to absorb a peak of 16 connection requests per cell period, that is, one from each input buffer, and issue at least one connection setup and one grant per cell period. The raw information that must be processed by the core controller is 16×5=80 bits wide at 25 MHz, resulting in several bits of control output, also at 25 MHz. CCCC can be made in a single VLSI but pinout and bus rates can be traded off, up to 100 MHz, to optimize cost.

At each port, there is a per-port control interface chip (PIC) 154 which communicates with the CCCC via control bus 152. Control information is exchanged with the input buffer through RLIC (Receive Line Interface Chip) and TLIC (Transmit Line Interface Chip). Data pass through the data selector under the control of the PIC. The PIC isolates the control links from the CCCC to filter the buffer report information and removes all redundant information from the stream of request messages. It keeps track of whether a request has been queued in the CCCC and keeps updated on the current buffer fill of each of the ATM queues in the input buffer. As a control bus interface, it allows a narrow bus to distribute the CCCC output signals, i.e. the XY addresses of the current connection set-up. The PIC reads this information on the control bus and drives its associated data bus selector. At each input buffer, only the first request of each kind is passed on to the CCCC until a connection is made to grant the request. Subsequent requests to the same destination are counted in the PIC, and are later determined for the size of the burst that will be granted to the input buffer.

The operation of the core control is described here in more detail. The PIC receives buffer requests consisting of destination port id (4 bits significant), and current buffer fill (8 or more bits). It ignores null requests and stores the current buffer fill in a 16 register file. Further, there is a 16 by 1 bit flag register to store whether there is an outstanding request to the CCCC. Upon receipt of a buffer request, and if there is no outstanding request, that request (id only) is transmitted to the CCCC over the control bus (functionally shown by arrows 156), and the flag is set. When the CCCC assigns a connection, the PIC receives this indication over the control bus, clears the request flag, and sends a buffer grant message back to the input buffer through TLIC; this message contains the destination port id, and a copy of the current buffer fill, as stored in the PIC register file.

The CCCC may receive up to 16 new buffer requests per cell tick (common chip processing cycle), but as it will only grant 1 or n per cycle, it will reach an equilibrium of receiving 1 or n per cycle as well. In the CCCC, each new request is put at the end of an internal queue of requests which is a list of all outstanding requests in sequence, with the oldest request at the head. Since there are up to 256 possible connections, the maximum size queue is 256. This queue is processed as fast as feasible to satisfy connection requests, i.e. 1 or n per cell tick. To satisfy a request, at each cell tick the queue is scanned backwards from the head until a request is found for which both the source and the destination are free. A CAM (Content Addressable Memory) implementation of the queue scans this asynchronously and very rapidly. When the connection is to be made, the corresponding request is then granted back to the PIC on the source card which PIC will copy the current buffer fill to a counter and ultimately to the requesting buffer, along with the accumulated count, to enable a burst of specified size. A record (flag registers) of both source and destination busy status is updated. On the destination card, the PIC sets the data selector. The counter on the source card is decremented by 1 for each cell tick. When it reaches 0, the agreed number of cells have been transmitted and the connection can be broken, i.e. the associated source and destination port busy flags in the CCCC must be cleared. This event can occur simultaneously in all PICs, and is reported back to the CCCC via the control bus or dedicated (1 per PIC) lines. The counters could also be located in the CCCC, requiring that the buffer fill value is reported from PIC to CCCC when the connection is set up.

Figure 12:
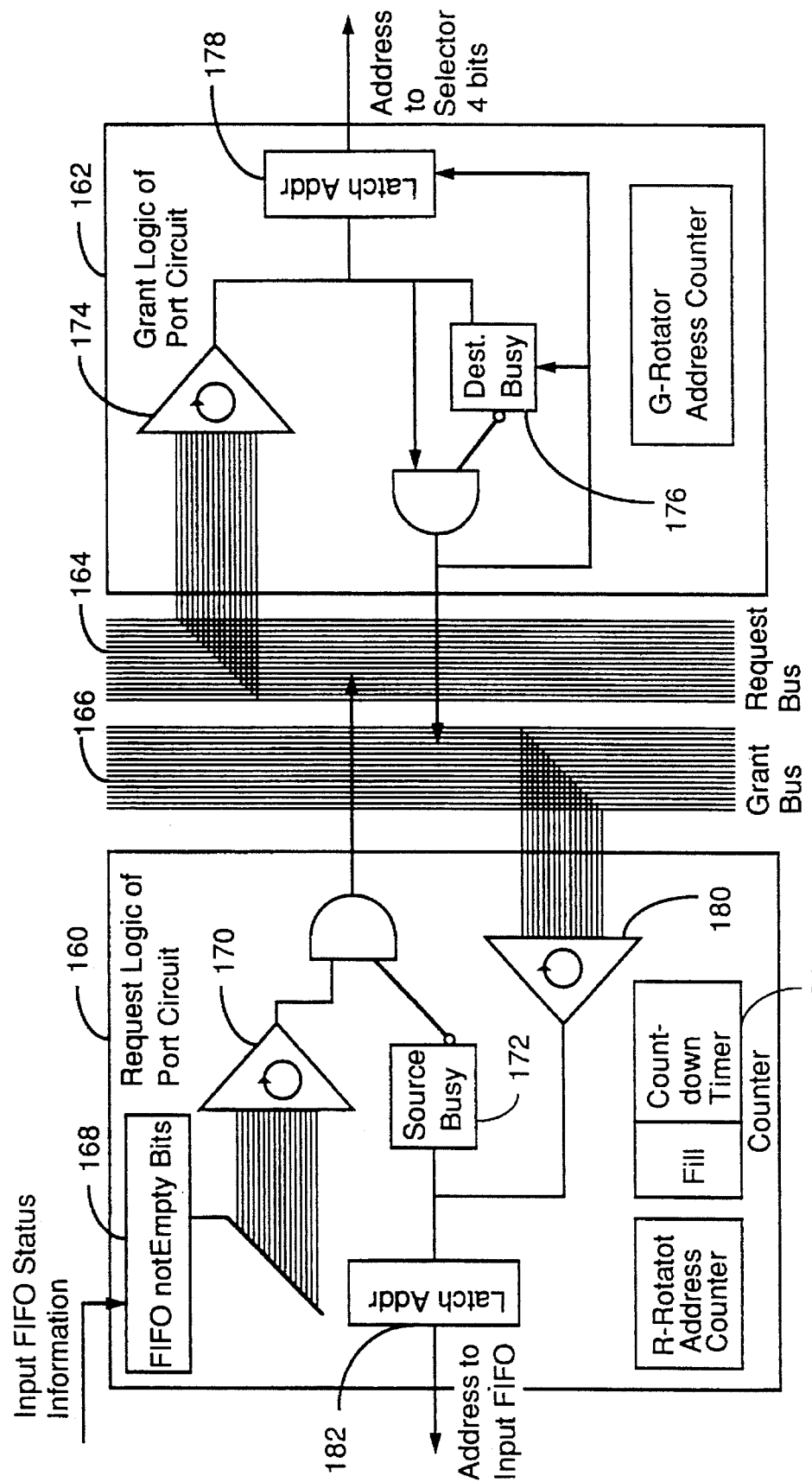
FIG. 12 in a schematic illustration of a distributed core control mechanism.

FIG. 12 shows the core control mechanism according to another embodiment of the invention. Unlike the common core control which has been described thus far, in this implementation, control is distributed to all the ports and is communicated through two sets of buses (grant bus and request bus). The figure shows a pair of port control circuits 160 and 162 exchanging control through request bus 164 and grant bus 166. As stated earlier, the buffer control keeps track of the status of input FIFO for each destination port and generates status information for each destination. This information is transmitted to port control circuit 160 over the control link. In addition to a register file which stores the actual cell count per port (not shown), a single bit per port is set for each destination which has an outstanding request and is shown in the figure as FIFO notEmpty bits 168, indicating that FIFOs have data to send to their assigned destinations. A multiplexer 170 scans FIFO notEmpty bits and sends connection requests to its assigned request bus segment if it is not busy with a connection as shown by a source busy block 172. One port drives only one assigned bus segment but all the ports monitor all the segments by scanning with multiplexer 174. If the destination is determined as not busy at 176, the destination port latches the address at 178, sends a 4-bit control signal to the space switch selector and returns a connection grant to the requesting port through its assigned segment of the grant bus. The requesting port receives the grant on the segment of the bus by scanning at multiplexer 180 and will recognize from which port the grant is received. If the requesting port is not busy with any other port, the destination address is latched at 182 and is sent to the buffer control for data transmission. During the subsequent data transfer, source 160 will not place another request on bus 164, and destination 162 will not respond to any requests until the predetermined count of cells has been transferred as monitored by a counter 184. The source status from the source busy block 172 on the source 160 is transmitted on a release bus (not shown). This bus is scanned by the destination 162 to determine when the predetermined count of cells have been transmitted. It should be noted that this is a simplified description to illustrate the concept of the invention. To achieve high performance (short idle time between successive connections), it is necessary to account for transmission delays on links by pre-computing (pipelining) control information to arrive just in time. This aspect of the control system is easily dealt with by someone skilled in the art. It should be noted that the delay in processing has negligible effect on throughput as the system deals with trains of cells over time spans similar in magnitude to the link delays.

Figure 13:
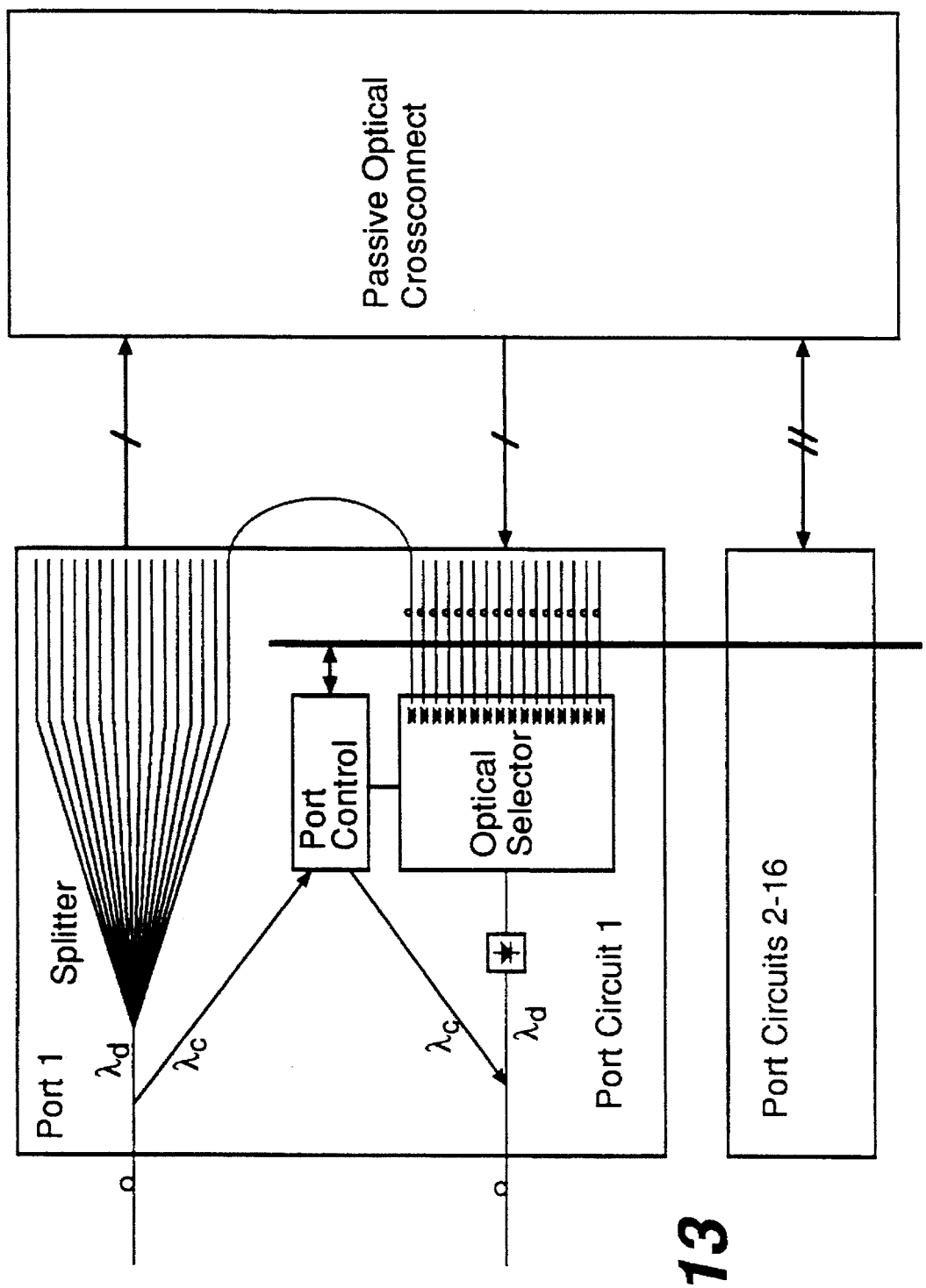
FIG. 13 shows a further embodiment of the invention in which a WDM (Wavelength Division Multiplexing) technique is used for sending data and control streams through a single fiber optic.

FIG. 13 shows another embodiment of the invention in which WDM (wavelength division multiplexing) is used for transmission of the control and data streams through a single optical fiber, avoiding the problem of time skew between them. British Patent Application Serial No. 9410544.2, filed on May 26, 1994, entitled "Switched Optical Interconnect" by the present inventor as a coinventor describes one way of WDM implementation for increasing the capacity of an ATM switch.

In another implementation, when a connection is taken down it may be desirable to force the same port to wait for a predetermined cell period before it is allowed to send the next connection request for the same destination. This forced wait will prevent one port from hogging the link.

Figure 14:
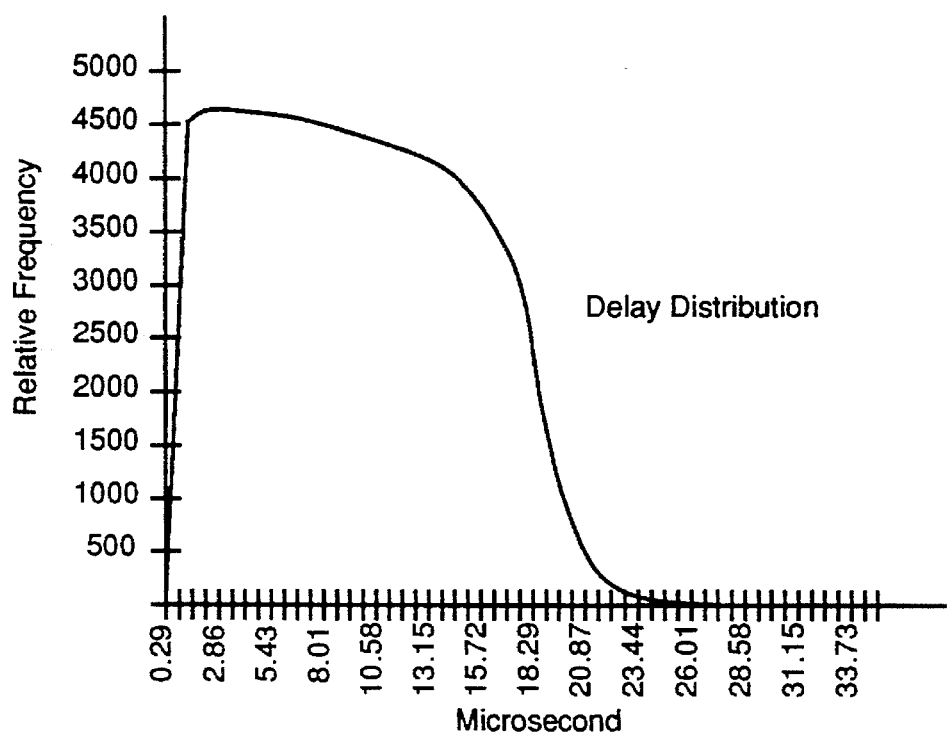
FIGS. 14 and 15 are graphs showing delay distribution and burst length distribution respectively.
Figure 15:
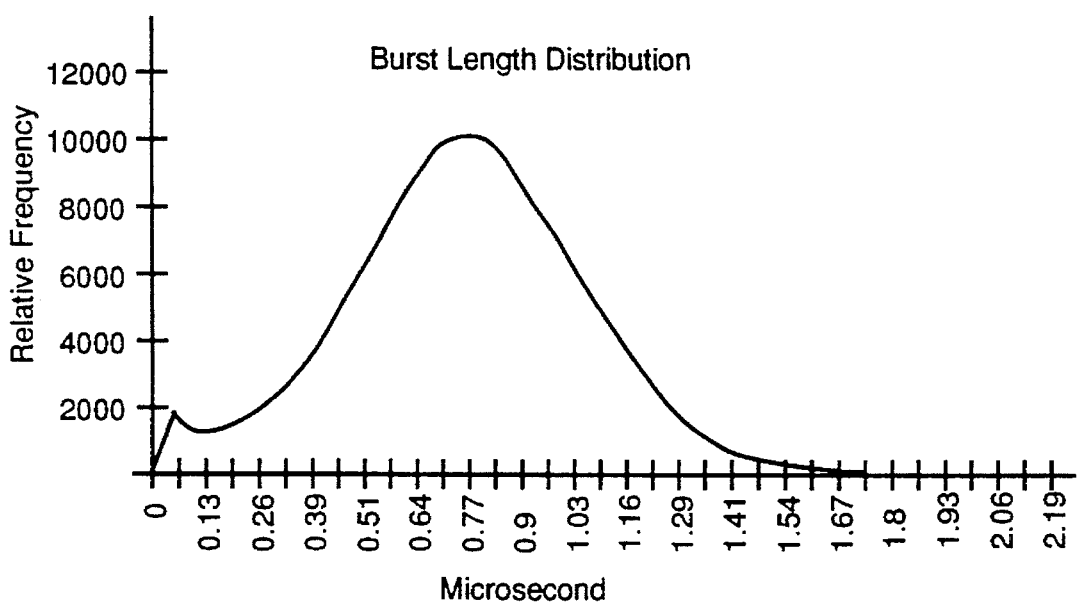

The frequency distribution charts in FIGS. 14 and 15 illustrate the simulated behavior of the first algorithm described for one simple case of 70% occupancy of all links, random (Poisson) traffic, with two idle cells forced inserted after every burst The delay distribution in FIG. 14 exhibits a characteristic square shape which is a result of the burst connection model: the last cell in a connection burst has to wait the shortest time, and the waiting time of the cells in the burst is, on the average, evenly distributed between the shortest (almost zero) and the longest service time of the request queue (about 26.0 microseconds here). The algorithm is designed to minimize not the average, but the maximum cell delay under heavy traffic.

In FIG. 15, the duration (burst length) of each connection is distributed around a mean of 0.77 μsec in the same simulation. Note the small abnormality near 0 which is due to the fact that during a connection period between ports A and B there is a certain small probability that A has registered another request for B. At that time, under heavy load, there is a larger than average probability that the connection A-B is the only free connection available immediately. This then results in a connection burst of a single cell, or very few cells. The forced wait scheme described above cures this small anomaly.

What is claimed is:

1. A large capacity ATM switch for switching data between input ports and output ports in a variable length train containing a variable number of digital cells, each input and output port handling one or more channels and each digital cell comprising a fixed number of bytes and including a cell header containing a channel indication therein, comprising:

each input port having an input buffer for separately storing trains of digital cells destined for output ports in response to each cell header and further having an input buffer control for monitoring the fill state of the input buffer and sending a connection request through a control link to a switch core device, the connection request indicating the number of cells in one of the trains stored in the input buffer;

the switch core device, in response to the connection request from one or more input buffers, for making and breaking high speed data link connections between the input ports and the output ports at desired times and indicating by way of the control link to each input buffer when to send the train of digital cells stored therein; and each output port delivering the digital cells received from the switch core device to any of the channels indicated by the channel indication in the cell header of each digital cell.

2. The large capacity ATM switch according to claim 1 wherein each output port further includes an output buffer and a header reader reading every cell header containing a channel indication so that cells are stored separately in the output buffer according to the channel indication of each cell.

3. The large capacity ATM switch according to claim 2 wherein the control link comprises a request bus and a grant bus, and both the input and output ports include multiplexers to scan both buses.

4. The large capacity ATM switch according to claim 2 wherein the switch core is a crossconnect which establishes physically the high speed data link connections among the input ports and the output ports.

5. The large capacity ATM switch according to claim 4 wherein each of the high speed data link connections is an optical link and 5 Gbit/s or higher in capacity.

6. The large capacity ATM switch according to claim 5 wherein each input port contains a serial-to-parallel converter for converting serial input in each channel to parallel digital cells and a multiplexer for multiplexing the parallel cells from one or more channels, which parallel digital cells are to be stored in the input buffers, and each output port contains a parallel-to-serial converter for converting parallel digital cells stored in the output buffer into serial output and a demultiplexer for demultiplexing the serial output to one or more channels.

7. The large capacity ATM switch according to claim 6 wherein the switch is an N×N switch, N being a positive integer, and the crossconnect comprises 1-to-N optical splitters, N×N optical shuffle and N-to-1 optical selectors.

8. The large capacity ATM switch according to claim 7 wherein the optical shuffle comprises a bundle of fiber optics, one fiber optic path for each possible connection between the input ports and output ports.

9. The large capacity ATM switch according to claim 7 wherein each of the optical selectors comprises N photodiodes optically connected to the optical shuffle and an electrical control means for selecting the signal from one of the N photodiodes in response to the connection requests from N input buffers.

10. The large capacity ATM switch according to claim 5 wherein the crossconnect is an optical crosspoint.

11. The large capacity ATM switch according to claim 4 wherein:

the high speed data link connection is an optical link which is wavelength division multiplexed with the control link, the control link comprising a request bus and a grant bus; and both the input and output ports include multiplexers to scan both buses.

12. A method of switching data in ATM mode between input ports and output ports in a variable length train containing a variable number of digital cells, each input and output port handling one or more channels and each digital cell comprising a fixed number of bytes and including a cell header containing a channel indication therein, comprising steps of:

in response to each cell header separately storing, at an input buffer of each input port, trains of digital cells destined for output ports;

monitoring the fill state of the input buffer and sending a connection request through a control link to a switch core device, the connection request indicating the number of cells in one of the trains stored in the input buffer;

at the switch core device, in response to the connection request from one or more input buffers, making and breaking high speed data link connections between the input ports and the output ports at desired times and indicating by way of the control link to each input buffer when to send the train of digital cells stored therein; and each output port delivering the digital cells received from the switch core device to any of the channels indicated by the channel indication in the header of each digital cell.

13. The method of switching data in ATM mode between input ports and output ports in a variable length train of digital cells, according to claim 12, comprising further steps of each output port reading every cell header containing a channel indication, and storing separately the cells received from the switch core means according to the channel indication in the header of each cell.

14. The method of switching data in ATM mode between input ports and output ports in a variable length train of digital cells, according to claim 13, comprising further steps of each input port sending a train of digital cells in optical signals, the switch core means making and breaking high speed data links for the optical signals.

15. The method of switching data in ATM mode between input ports and output ports in a variable length train of digital cells, according to claim 14, comprising further steps of each input port sending a train of digital cells and the connection request in wavelength division multiplexed optical signals.

* * * * *